United States Patent [19]

Berriman

[11] E Re. 29,974

[45] Reissued Apr. 24, 1979

[54] SILVER SALT DIRECT POSITIVE EMULSION

[75] Inventor: Robert W. Berriman, Harrow, England

[73] Assignee: Eastman Kodak Company, Rochester, N.Y.

[21] Appl. No.: 794,489

[22] Filed: May 6, 1977

Related U.S. Patent Documents

Reissue of:

[64] Patent No.: 3,367,778
Issued: Feb. 6, 1968
Appl. No.: 448,467
Filed: Apr. 15, 1965

[51] Int. Cl.[2] ..... G03C 1/28

[52] U.S. Cl. ..... 96/108; 96/64; 96/101; 96/107

[58] Field of Search ..... 96/64, 107, 108, 101

[56] References Cited

U.S. PATENT DOCUMENTS

| | | | |
|---|---|---|---|
| 2,500,140 | 3/1950 | Teal et al. | 96/64 |
| 2,717,833 | 9/1955 | Wark | 96/64 |
| 3,178,282 | 4/1965 | Luckey et al. | 96/64 |
| 3,206,313 | 9/1965 | Porter et al. | 96/107 |

FOREIGN PATENT DOCUMENTS

| | | | |
|---|---|---|---|
| 1169290 | 4/1964 | Fed. Rep. of Germany | 96/107 |
| 1367941 | 6/1964 | France | 96/108 |
| 723019 | 2/1955 | United Kingdom | 96/108 |

OTHER PUBLICATIONS

E. Moisar & S. Wagner, Investigation of the Topography of Latent Interior and Exterior Images, Bunsengesellschaft für Physikalische Chemie. Berichte 67, pp. 356–359 (1963) No. 4.

*Primary Examiner*—Won H. Louie, Jr.
*Attorney, Agent, or Firm*—Carl O. Thomas

[57] ABSTRACT

*Light-sensitive photographic direct positive silver salt emulsions for use in photographic elements are disclosed. The emulsions contain silver salt grains, typically silver halide grains. The silver salt grains are comprised of a core containing centers which promote the deposition of photolytic silver and a shell covering the core. The shell is fogged and develops to silver without exposure.*

6 Claims, No Drawings

SILVER SALT DIRECT POSITIVE EMULSION

Matter enclosed in heavy brackets [ ] appears in the original patent but forms no part of this reissue specification; matter printed in italics indicates the additions made by reissue.

*This is a resissue application of U.S. Patent 3,367,778, based on U.S. Ser. No. 448,467, filed Apr. 15, 1965.*

This invention relates to a novel class of photographic emulsions, and more particularly, to direct positive emulsions (sometimes called reversal emulsion).

Direct positive silver halide emulsions are well known in the photographic art. However, many reversal systems are characterized as being of low speed, producing undesirably high background or $D_{min}$ density, requiring special developing compositions, requiring processing steps between exposure and development, being difficult to control, and the like undesirable features.

It is accordingly an object of this invention to provide a novel class of photographic direct positive emulsions.

It is another object of this invention to provide novel photographic direct positive emulsions having relatively high sensitivity.

It is another object of this invention to provide novel photographic emulsions that are characterized in producing direct positive images having low $D_{min}$.

It is another object of this invention to provide novel photographic emulsions that can be processed to a direct positive with conventional surface-developing compositions.

It is still another object of this invention to provide novel direct positive silver halide emulsions that have higher sensitivity than conventional direct positive silver halide emulsions utilizing the Herschel effect.

It is likewise an object of this invention to provide new direct positive silver halide emulsions that have rapid processing characteristics.

These and other objects of the invention are accomplished with light-sensitive photographic direct positive emulsions containing grains comprising a central core of a water-insoluble silver salt containing centers which promote the deposition of photolytic silver and an outer shell or covering for such core of a fogged or spontaneously developable water-insoluble silver salt. The fogged shell of such grains develops to silver without exposure.

Before the shell of water-insoluble silver salt is added to the silver salt core, the core emulsion is first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Saubenier in Science et Industries Photographiques, vol. XXVIII, January 1957, pp. 1 to 23 and January 1957, pp. 57 to 65 are particularly useful. Such chemical sensitization includes three major classes, namely, gold or noble metal sensitization, sulfur sensitization, such as by a labile sulfur compound, and reduction sensitization, i.e., treatment of the silver halide with a strong reducing agent which introduces small specks of metallic silver into the silver salt crystal or grain.

When the core emulsion is chemically sensitized, it is preferably sensitized so that when examined according to normal photographic testing techniques by coating a test portion of the emulsion on a transparent support, exposing to a light intensity scale for a fixed time between 0.01 and 1 second and development for 6 minutes at 68° F. in Developer A, as hereinafter defined, has a sensitivity greater than the sensitivity of an identical test portion of the same emulsion (measured at a density of 0.1 above fog), which has been exposed in the same way, bleached 5 minutes in an aqueous 0.3 percent potassium ferricyanide solution at 65° F., and developed for 5 minutes at 65° F., in Developer B, as hereinafter defined. Developer A is the usual type of surface image developer and Developer B is an internal developer having high silver halide solvent activity.

| DEVELOPER A | | |
|---|---|---|
| N-methyl-p-aminophenol sulfate | grams | 2.5 |
| Ascorbic acid | " | 10.0 |
| Potassium metaborate | " | 35.0 |
| Potassium bromide | " | 1.0 |
| Water to | liter | 1 |
| pH of | | 9.6 |

| DEVELOPER B | | |
|---|---|---|
| N-methyl-p-aminophenol sulfate | grams | 2.0 |
| Sodium sulfite, desiccated | " | 90.0 |
| Hydroquinone | " | 8.0 |
| Sodium carbonate, monohydrate | " | 52.5 |
| Potassium bromide | " | 5.0 |
| Sodium thiosulfate | " | 10.0 |
| Water to | liter | 1 |

The core emulsions can be chemically sensitized by any of the accepted procedures. The core emulsions can be digested with naturally active gelatin, or sulfur compounds can be added, such as those described in Sheppard U.S. Patent 1,574,944, issued Mar. 2, 1926, Sheppard et al. U.S. Patent 1,623,499 issued Apr. 5, 1927, and Sheppard et al. U.S. Patent 2,410,689 issued Nov. 5, 1946.

The core emulsions can also be chemically sensitized with gold salts as described in Waller et al. U.S. Patent 2,399,083 issued Apr. 23, 1946 and Damschroder et al. U.S. Patent 2,642,361 issued Jun. 16, 1953. Suitable compounds are potassium chloroaurite, potassium aurithiocyanate, potassium chloroaurate, auric trichloride and 2-aurosulfobenzothiazole methochloride.

The core emulsions can also be chemically sensitized with reducing agents, such as stannous salts (Carroll U.S. Patent 2,487,850 issued Nov. 15, 1949), polyamines, such as diethylene triamine (Lowe and Jones U.S. Patent 2,518,698 issued Aug. 15, 1950), polyamines, such as spermine (Lowe and Allen U.S. Patent 2,521,925 issued Sept. 12, 1950), or bis($\beta$-aminoethyl)-sulfide and its water-soluble salts (Lowe and Jones U.S. Patent 2,521,926 issued Sept. 12, 1950).

The core emulsions can also be treated with salts of the noble metals and/or the metals of Group VIII of the Periodic Table, such as ruthenium, rhodium, palladium, iridium, osmium, and platinum. Representative compounds are ammonium chloropalladate, potassium chloroplatinate, and sodium chloropalladite, which are used for sensitizing in amounts below that which produces any substantial fog inhibition, as described in Smith and Trivelli U.S. Patent 2,448,060, issued Aug. 31, 1948, and as anti-foggants in higher amounts, as described in Trivelli and Smith U.S. Patents 2,566,245, issued Aug. 28, 1951 and 2,566,263, issued Aug. 28, 1951.

The core emulsions can also be subjected to fogging by exposure to light either to low or high intensity light, to produce centers which promote the deposition of photolytic silver prior to forming the shell thereon.

The core emulsions can also contain speed increasing compounds of the quaternary ammonium type of Carroll U.S. Patent 2,271,623, issued Feb. 3, 1942; Carroll and Allen U.S. Patent 2,288,226, issued Jun. 30, 1942; and Carroll and Spence U.S. Patent 2,334,864, issued Nov. 23, 1943; or the polyethylene glycol type of Carroll and Beach U.S. Patent 2,708,162, issued May 10, 1955; or the quaternary ammonium salts and polyethylene glycols of Piper U.S. Patent 2,886,437, issued May 12, 1959; as well as the thiopolymers of Graham and Sagal U.S. Patent 3,046,129, issued July. 24, 1962; and the Dann and Chechak U.S. Patent 3,046,134, issued July 24, 1962.

The shell of the grains comprising the present emulsions is prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface fogged to make it developable to metallic silver with conventional surface image developing compositions. The silver salt of the shell is sufficiently fogged to produce a density of at least about 0.5 when developed for 6 minutes at 68° F. in Developer A above when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

In a typical embodiment of the invention, the core of the grains of the present emulsions is a coarse grained silver salt and a finer grained silver salt is deposited thereon to form a shell. Also, coarse grained silver salts can be used to form a shell over a finer grained core when the shell-forming silver salt is more water-soluble than the core silver salt. Generally, about 2 to 8 molar equivalents of shell silver salt per molar equivalent of core silver salt are used in the grains comprising the emulsions of the invention. The present emulsions, which can be termed "covered grain" emulsions, contain a population of grains which are substantially uniform in grain-size distribution, as contrasted with other emulsion blends which contain at least two types of grains, which are separate and distinct in their physical, and frequently, photographic properties. The grain size of the subject emulsions widely varies, typical emulsions having an average grain size of about .1 to 10 microns in diameter.

Silver halides are preferably utilized to prepare the core as well as the shell of the grains comprising the emulsions of the invention. Suitable silver halides include silver chloride, silver bromide, silver chlorobromide, silver bromoiodide and silver chlorobromoiodide. Other suitable salts for the core and/or the shell include silver thiocyanate, silver phosphate, silver cyanide, silver carbonate and the like.

A wide variety of hydrophilic, water-permeable organic colloids can be suitably utilized in preparing the silver salt emulsions or dispersions of the invention. Gelatin is preferably utilized although other colloidal material such as colloidal albumin, cellulose derivatives, synthetic resins or the like can be utilized. Suitable colloids that can be used are polyvinyl alcohol or a hydrolyzed polyvinyl acetate as described in Lowe U.S. Patent 2,286,215, issued June 16, 1942; a far hydrolyzed cellulose ester such as cellulose acetate hydrolyzed to an acetyl content of 19 to 26% as described in U.S. Patent 2,327,808 of Lowe and Clark, issued Aug. 24, 1943; a water-soluble ethanolamine cellulose acetate as described in Yutzy U.S. Patent 2,322,085, issued June 15, 1943; a polyacrylamide having a combined acrylamide content of 30 to 60% and a specific viscosity of 0.25 to 1.5 of an imidized polyacrylamide of like acrylamide content and viscosity as described in Lowe, Minsk and Kenyon U.S. Patent 2,541,474, issued Feb. 13, 1951; zein as described in Lowe U.S. Patent 2,563,791, issued Aug. 7, 1951; a vinyl alcohol polymer containing urethane carboxylic acid groups of the type described in Unruh and Smith U.S. Patent 2,768,154, issued Oct. 23, 1956; or containing cyano-acetyl groups such as the vinyl alcohol-vinyl cyanacetate copolymer as described in Unruh, Smith and Priest U.S. Patent 2,808,331, issued Oct. 1, 1957; or a polymeric material which results from polymerizing a protein or a saturated acylated protein with a monomer having a vinyl group as described in Illingsworth, Dann and Gates U.S. Patent 2,852,382, issued Sept. 19, 1958.

The emulsions of the invention can be coated on a wide variety of supports in accordance with usual practice. Typical supports for photographic elements of the invention include glass, metals, paper, polyethylene-coated paper, polypropylene-coated paper, cellulose nitrate film, cellulose acetate film, polyvinyl acetal film, polystyrene film, polyethyleneterephthalate film and related films of resinous materials and others.

When the photographic emulsions of the invention are exposed to an image and thereafter developed in a conventional surface image developer having low silver halide solvent action, a direct positive silver image is formed. The unexposed grains develop without substantial reduction of the image-wise exposed grains. The image can thereafter be fixed or stabilized by conventional techniques.

The invention is further illustrated by the following examples of preferred embodiments thereof.

Example 1

A gelatino silver chloride emulsion was prepared by simultaneously adding, over a period of about 20 minutes, 1000 ml. of a 4 molar silver nitrate aqueous solution and 1000 ml. of a 4 molar sodium chloride aqueous solution to a well-stirred aqueous solution of 1000 ml. of 0.01 molar sodium chloride at 70° C. containing 40 grams of gelatin. Thereafter 5000 ml. of water containing 280 grams of gelatin were added and the emulsion cooled. One-eighth of the resulting gelatino silver chloride emulsion (containing 0.5 mole percent silver chloride) was melted at 40° C., 100 mg. of the water-soluble irridium salt, potassium chloroiridite, dissolved in water were added, and the emulsion was heated to 70° C. This prepared emulsion constituted the silver chloride core containing physical discontinuities that trap electrons over which was coated a shell of silver chloride. The shell of silver chloride was formed by adding to the core emulsion 500 ml. of 4 molar silver nitrate aqueous solution and 500 ml. of 4 molar sodium chloride aqueous solution simultaneously over a period of 20 minutes. Then 160 grams of gelatin, previously soaked in 340 ml. of water were then stirred in, and the emulsion cooled. During both additions of the silver nitrate and sodium chloride (i.e., to form both the core and the shell), the two solutions were added at approximately constant rates. Sufficient silver chloride was formed in the shell to give a ratio of 4 moles of shell silver chloride to 1 mole of core silver chloride. The resulting covered grain emulsion was melted, the gelatin content increased to 160 grams per mole of silver chloride, and water added to 4000 grams per mole of silver chloride. The covered grain emulsion was then coated on paper at a silver chloride coverage of one mole per 1000 square feet. The coated emulsion was surfaced fogged by flashing with a Clive Courtney microflash at a distance of 30 inches (a flash unit with a 50 joule output and an exposure time of about $2\times10^{-6}$ seconds). When exposed to a neutral density stepwedge having 0.15 log E increments with a relative low intensity exposure of 30 seconds duration to tungsten light (250-watt bulb at 30 inches) and developed in the developer below, a direct positive image was obtained. The development was for three minutes at 20° C. The developer had the following composition:

| | Grams |
|---|---|
| p-Hydroxyphenyl glycine | 24.0 |
| Sodium carbonate (anhydrous) | 40.0 |
| Sodium chloride | 1.4 |
| Water to make one liter. | |

Similar results are obtained when the silver salt is silver thiocyanate, sodium thiocyanate being used in lieu of the sodium chloride during the core and/or shell formation.

Example 2

A gelatino silver bromide emulsion was prepared by the general method described in Example 1. Silver nitrate and potassium bromide aqueous solutions were run into an aqueous solution of gelatin for 20 minutes at 70° C. The emulsion was cooled and 0.2 g. of potassium chloroiridite per mole of silver halide was added. The emulsion was reheated to 70° C. and more silver nitrate and potassium bromide aqueous solution were run in for 20 minutes to form a shell of silver bromide. Sufficient silver bromide was formed in the shell to give a ratio of 4 moles of shell silver bromide to 1 mole of core silver bromide. The resulting emulsion was cooled to 40° C. and fogged by adding 3.5 mg. of thiourea dioxide per mole of silver halide and 4 ml. of 2.5 N sodium hydroxide per mole of silver halide. The resulting emulsion was heated to 55° C., held for 30 minutes, and cooled. The emulsion was acidified and gelatin added to bring the total to 165 g. of gelatin per mole of silver halide. The resulting emulsion was coated on a paper support at a coverage of about one mole of silver halide per 1000 square feet. The coated emulsion was thereafter exposed in an intensity scale sensitometer to tungsten light and developed for 60 seconds at 68° F. in the developer described below, fixed, washed and dried. The developer utilized had the following formula:

| | Grams |
|---|---|
| N-methyl-p-aminophenol sulfate | 3.0 |
| Sodium sulfite (anhydrous) | 45.0 |
| Hydroquinone | 12.0 |
| Sodium carbonate monohydrate | 80.0 |
| Potassium bromide | 2.0 |
| Water to make two liters. | |

The exposed and processed coating exhibited a direct positive image having a $D_{max}$ of 0.9.

Example 3

Four separate gelatino silver chloride emulsions were prepared to illustrate the utility of the present covered grain silver salt emulsions (i.e., a core containing centers which promote formation of photolytic silver and a fogged shell) as direct positive emulsions.

Emulsion A—Core sensitized to fog: A gelatino silver chloride emulsion was prepared by adding aqueous solutions of silver nitrate and potassium chloride simultaneously to a rapidly agitated gelatin solution over a period of 20 minutes at 70° C. This emulsion was then reduction sensitized into fog by adding an excess of silver nitrate and holding for 20 minutes at 70° C. at a pAg of 2.5 and a pH of 7.5. Following this treatment, the pH was adjusted to 5.5 and the pAg to 6.8. The resulting emulsion was coated on a paper support at a coverage of 120 mg. of silver per square foot and 200 mg. of gelatin per square foot.

Emulsion B—Core sensitized to fog and unfogged sensitizing shell: A gelatino silver chloride emulsion was prepared and reduction sensitized into fog as described for Emulsion A above. After the reduction sensitization, aqueous solutions of silver nitrate and potassium chloride were added simultaneously to the core emulsion over a period of 20 minutes at 70° C. to form a silver chloride shell over the reduction sensitized silver chloride core. Sufficient silver chloride was formed in this shell to give a ratio of four moles of shell silver chloride to one mole of core silver chloride. The resulting emulsion was coated as described for Emulsion A.

Emulsion C—Core and shell sensitized to fog: A gelatino silver chloride emulsion was prepared as described above for Emulsion B except that after the shell silver halide was formed, the emulsion was reduction sensitized into fog by adding 2 mg. of thiourea dioxide per mole of silver halide and holding the resulting emulsion for 15 minutes at 55° C. The resulting emulsion was then coated as described for Emulsion B.

Emulsion D—Unfogged sensitized core and shell sensitized to fog: An emulsion was prepared as described above for Emulsion C, except that the core was not reduction sensitized into fog by adding an excess of silver nitrate as described in more detail for Emulsion A.

A sample of each of the four coatings was exposed on an intensity scale sensitometer and processed for 10 seconds at 68° F. in the developer described in Example 2, fixed, washed and dried with the following results:

| Emulsion | Core | Shell | Rel. Speed | Contrast | D max. | D min. | ΔD |
|---|---|---|---|---|---|---|---|
| A | Sensitized to fog | None | | | 1.65 | 1.65 | 0 |

-continued

| Emulsion | Core | Shell | Rel. Speed | Contrast | D max. | D min. | ΔD |
|---|---|---|---|---|---|---|---|
| B | " | Unfogged | | | 0 | 0 | 0 |
| D | Unfogged | Sensitized to fog | 100 | 1.6 | 1.35 | 0.04 | 1.31 |
| C[1] | Sensitized to fog | " | 795 | 5.0 | 1.30 | 0.01 | 1.29 |

[1]A preferred emulsion of the invention.

Example 4

A gelatino silver chloride core emulsion was prepared by adding aqueous solutions of silver nitrate and sodium chloride simultaneously over a period of 20 minutes to a rapidly agitated aqueous gelatin solution at a temperature of 70° C. To a liquid portion of this emulsion containing 0.5 mole of silver chloride was added 0.1 g. of potassium chloroiridite in 100 ml. of water, and the resulting mixture held for 10 minutes at 70° C. to chemically sensitize the core emulsion. Aqueous solutions of silver nitrate and silver chloride were thereafter added simultaneously to the core over a period of 20 minutes at 25° C. to form a silver chloride shell over the chemically sensitized core emulsion. Sufficient silver chloride was formed in the shell to give a ratio of four moles of silver chloride shell to one mole of silver chloride core. The resulting emulsion was reduction sensitized into fog by adding an excess of silver nitrate thereto and holding the emulsion for 30 minutes at 55° C. at a pAg of about 2.5 and a pH of 7.4. Following this reduction sensitizing treatment, the pAg was adjusted to 7.0 by the addition of aqueous potassium chloride solution. The resulting emulsion was then coated on a paper support at a coverage of 108 mg. of silver per square foot and 625 mg. of gelatin per square foot. A sample of this coating was exposed on an intensity scale sensitometer and processed for three minutes at 20° C. in the developer described in Example 1, fixed, washed and dried. A direct-positive image was formed having the following characteristics:

| | |
|---|---|
| Contrast | 1.20 |
| $D_{max.}$ | 1.10 |
| $D_{min.}$ | 0.20 |
| ΔD | 0.90 |

The present invention thus provides a new and useful class of direct positive silver halide emulsions.

The invention has been described in considerable detail with particular reference to preferred embodiments thereof, but will be understood that variations and modifications can be effected within the spirit and scope of the invention as described hereinabove and as defined in the appended claims.

I claim:

[1. A light-sensitive photographic direct positive emulsion containing grains comprising a central core of a water-insoluble silver salt containing centers which promote the deposition of photolytic silver and an outer shell covering said core comprising a fogged water-insoluble silver salt that develops to silver without exposure.]

[2. The process which comprises exposing to an image an emulsion as described in claim 1 and thereafter developing the exposed emulsion in a surface image silver halide developing composition of low silver halide solvent action sufficient to develop unexposed grains of the emulsion without substantial development of the image-wise exposed grains of the emulsion.]

[3. A light-sensitive photographic direct positive emulsion containing grains comprising a central core of silver halide containing centers which promote the deposition of photolytic silver and an outer shell covering said core comprising a fogged silver halide that develops to silver without exposure.]

[4. A light-sensitive photographic direct positive emulsion containing silver halide grains comprising a central core of chemically sensitized silver halide and an outer shell covering said core comprising fogged silver halide that develops to silver without exposure.]

[5. The direct positive emulsion of claim 4 wherein said outer shell is fogged with a reduction sensitizer.]

[6. The direct positive emulsion of claim 4 wherein said outer shell is fogged with a gold salt and a reduction sensitizer.]

[7. A light-sensitive photographic direct positive emulsion containing grains comprising a central core of a water-insoluble silver salt containing centers which promote the deposition of photolytic silver, said centers being obtained by treatment of said core with an iridium salt, and an outer shell covering said core comprising a fogged water-insoluble silver salt that develops to silver without exposure.]

8. A light-sensitive photographic direct positive emulsion containing silver halide grains comprising a central core of silver halide containing centers which promote the deposition of photolytic silver, said centers being obtained by treatment of said core with an iridium salt, and an outer shell covering said core comprising fogged silver halide that develops to silver without exposure.

[9. A light-sensitive photographic direct positive emulsion containing silver halide grains comprising a central core of fogged silver halide and an outer shell covering said core comprising fogged silver halide, said outer shell being fogged subsequent to the formation of said outer shell.]

10. A light-sensitive photographic direct positive gelatino emulsion containing silver chloride grains comprising a central core of silver chloride containing centers which promote the deposition of photolytic silver, said centers being obtained by treatment of said core with an iridium salt, and an outer shell covering said core comprising fogged silver chloride that develops to silver without exposure.

*11. A light-sensitive photograhic direct positive emulsion containing grains comprising a central core of silver halide containing centers which are formed by treatment with a salt of a noble Group VIII metal and which promote the deposition of photolytic silver and an outer shell covering said core comprising a fogged silver halide that develops to silver without exposure.*

*12. The direct positive emulsion of claim 11 wherein said outer shell is fogged with a reduction sensitizer.*

*13. The direct positive emulsion of claim 11 wherein the outer shell is fogged with a gold salt and a reduction sensitizer.*

*14. A light-sensitive photographic direct positive emulsion containing grains comprising a central core of silver halide containing centers which are formed by treatment with an iridium salt and which promote the deposition of photolytic silver and an outer shell covering said core comprising a fogged silver halide that develops to silver without exposure wherein the outer shell is fogged with a gold salt and a reduction sensitizer.*

* * * * *